United States Patent [19]

Akiba et al.

[11] Patent Number: 5,287,337
[45] Date of Patent: Feb. 15, 1994

[54] OPTICAL PICKUP HAVING FLEXIBLE WIRING PLATE WITH FOCUSING EFFECTIVE LENGTH WHICH ELIMINATES PLATE RESTORING FORCE INDUCE PICKUP TILT DURING FOCUSING

[75] Inventors: Taichi Akiba; Yoshitsugu Araki; Toshihiko Kurihara, all of Saitama, Japan

[73] Assignee: Pioneer Electronic Corporatioin, Tokyo, Japan

[21] Appl. No.: 659,653

[22] Filed: Feb. 25, 1991

[30] Foreign Application Priority Data

| May 26, 1990 | [JP] | Japan | 2-135726 |
| Dec. 17, 1990 | [JP] | Japan | 2-417868 |
| Dec. 17, 1990 | [JP] | Japan | 2-417869 |

[51] Int. Cl.$^5$ .............................................. G11B 7/12
[52] U.S. Cl. ................................ 369/44.15; 369/44.11
[58] Field of Search .............. 369/44.15, 44.16, 44.14, 369/44.17, 44.11, 112

[56] References Cited

U.S. PATENT DOCUMENTS

| 4,702,555 | 10/1987 | Iguma et al. | 369/44.15 |
| 4,822,139 | 4/1989 | Yoshizumi | 369/32 |

FOREIGN PATENT DOCUMENTS

| 58-64649(A) | 4/1983 | Japan | 369/44.16 |
| 63-124233(A) | 5/1988 | Japan | 369/44.15 |

*Primary Examiner*—Aristotelis Psitos
*Assistant Examiner*—Muhammad N. Edun
*Attorney, Agent, or Firm*—Nikaido, Marmelstein, Murray & Oram

[57] ABSTRACT

An optical pickup has a suspension base, a holder suspended from the suspension base by wires in a form of a cantilever, an optical system provided in the holder and having a mirror and an objective mounted in a body, and a flexible wiring plate connected between the holder and the suspension base. Effective length of the flexible wiring plate for focusing is approximately equal to suspension effective length of the wire. The flexible wiring plate comprises a pair of horizontal planes perpendicular to focusing direction and a vertical plane perpendicular to tracking direction provided between the horizontal planes.

4 Claims, 7 Drawing Sheets

OPTICAL PICKUP HAVING FLEXIBLE WIRING PLATE WITH FOCUSING EFFECTIVE LENGTH WHICH ELIMINATES PLATE RESTORING FORCE INDUCE PICKUP TILT DURING FOCUSING

BACKGROUND OF THE INVENTION

The present invention relates to an optical pickup for reproducing data on a disk such as a compact disk (CD) and a laser disk (LD), and for producing a focus error signal and a tracking error signal for focusing and tracking the pickup.

FIG. 11 shows a conventional optical pickup. The optical pickup comprises a holder 1 having a coil 2 for focusing and a coil 2a for tracking, a pair of supporting plates 9 and 9a, and print circuit boards 6 and 6a secure to the supporting plates 9 and 9a. The holder has an optical system 1a. The holder 1 is suspended from the print circuit board 6 and 6a by four conductive wires 5. A pair of yokes 4 each having a magnet 3 are mounted on the supporting plates 9 and 9a, respectively. The holder 1 is disposed between the yokes 4 so as to oppose the coil 2 and 2a to the yokes, respectively. The holder 1 has a plurality of elements which are connected to a circuit substrate 8 through a flexible wiring plate 7. The flexible wiring plate 7 is curved at a central portion thereof for connecting the holder to the circuit substrate 8. An exciting current is supplied to the coils 2 and 2a, through the conductive wires 5 for moving the holder 1 in the focusing direction and the tracking direction.

In such a device, when the holder 1 is moved in the focusing direction, the flexible wiring plate 7 is twisted at a central portion thereof. Restoring force of the flexible wiring plate 7 causes the holder 1 to tilt with respect to the optical axis. Consequently, it is difficult to accurately focus the optical system of the pickup.

SUMMARY OF THE INVENTION

The object of the present invention is to provide an optical pickup in which an optical system is not tilted at focusing thereof, whereby the characteristic of the optical pickup is improved.

According to the present invention, there is provided an optical pickup having a suspension base, a holder suspended from the suspension base by wires in a form of a cantilever, an optical system provided in the holder and having a mirror and an objective mounted in a body, and a flexible wiring plate connected between the holder and the suspension base. The optical pickup of the present invention is characterized in that focusing effective length of the flexible wiring plate for focusing is approximately equal to a suspension effective length of the wire, a pair of horizontal planes perpendicular to focusing direction are provided on both end portions of the focusing effective length, a vertical plane perpendicular to tracking direction is provided between the horizontal planes.

In an aspect of the invention, the effective length of the vertical plane is ⅓ to 1/5 of the focusing effective length. Bent portions of the flexible wiring plate are coated with a first resin and other portions than the bent portions are coated with a second resin, the first resin having a toughness higher than the second resin.

The other objects and features of this invention will become understood from the following description with reference to the accompanying drawings.

DETAILED DESCRIPTION OF THE PREFERRED EMBODIMENT

Figure 1:
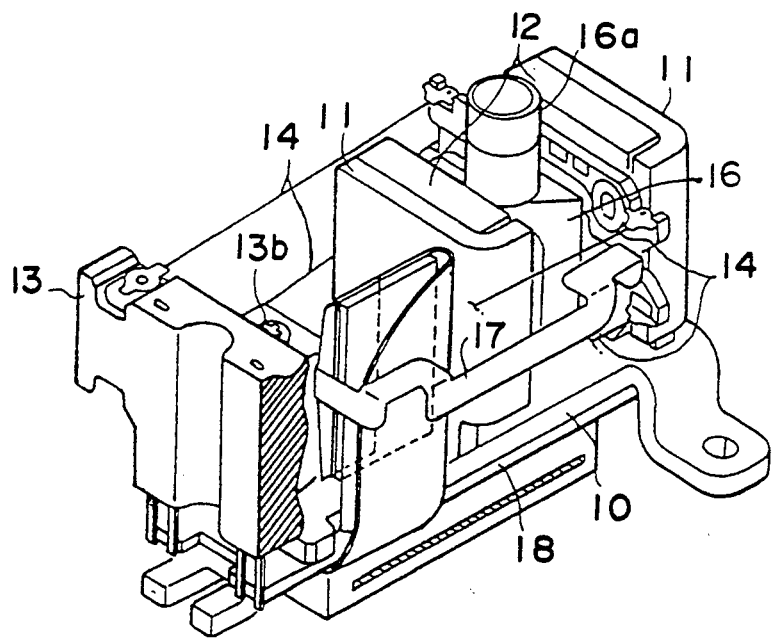
FIG. 1 is a perspective view of an optical pickup according to the present invention.
Figure 2:
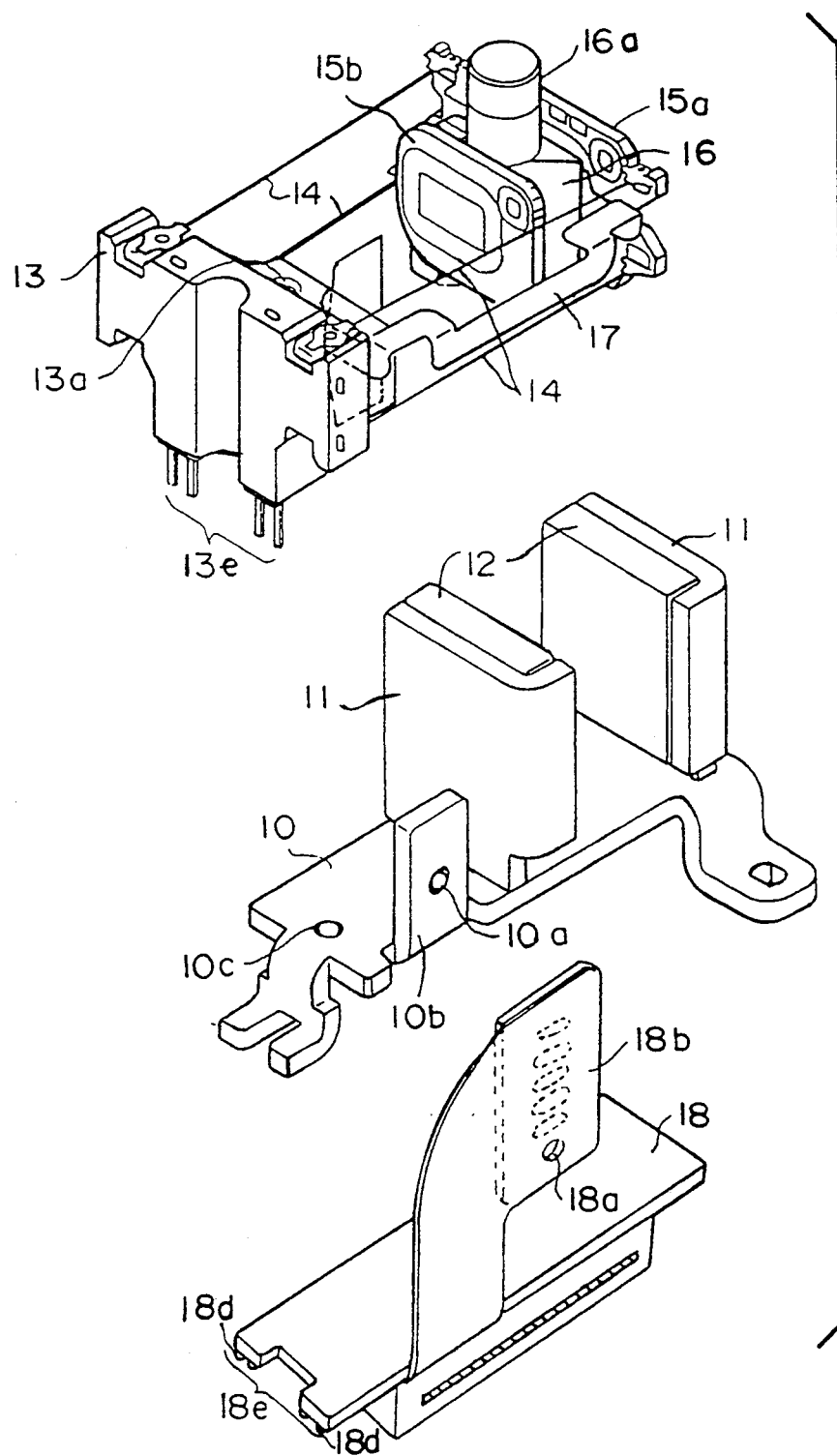
FIG. 2 is an exploded perspective view of the optical pickup.

Referring to FIGS. 1 and 2, the optical pickup according to the present invention comprises the holder 16, a suspension base 13, a yoke base 10, and a circuit substrate 18. The holder 16 has an optical system 16a and a pair of coil substrates 15a and 15b. On each soil substrate, an exciting coil (not shown) is mounted. The holder 16 is suspended from the suspension base 13 made of plastic by four conductive spring wires 14 in the form of a cantilever. Four terminals 13e each connected to the conductive wire 14 are embedded in the suspension base 13 by insert molding. The yoke base 10 has a pair of yokes 11, each having a magnet 12. The yoke base 10 is secured to the underside of the suspension base 13 by a screw 13b engaged with a hole 13a of the base 13 and a hole 10c formed in the yoke base 10. Both the magnets 12 are positioned adjacent the coil substrates 15a and 15b, respectively.

The circuit substrate 18 has an attaching plate 18b having a hole 18a and a pair of terminal portions 18e. The circuit substrate 18 is secured to the yoke base 10 by a screw (not shown) engaged with a hole 10a formed in n attaching plate 10b of the yoke base 10 and in the hole 18a.

An exciting current is supplied to the coil substrates 15a and 15b through conductive wires 14. A circuit (not shown) in the optical system 16a is connected to terminals 13e of the suspension base 13 through a flexible wire plate 17. Each of the terminals 13e is soldered to an end of a corresponding wire 18d on the circuit substrate 18.

Figure 3:
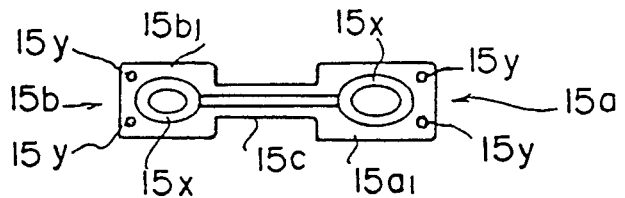
FIGS. 3 and 4 are developments of a coil substrate.
Figure 4:
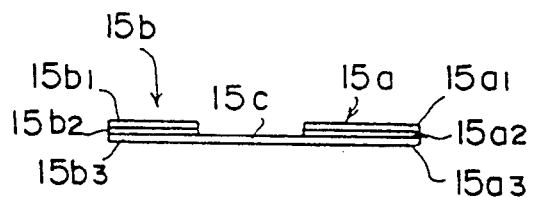

FIG. 3 and 4 are developments of the coil substrates 15a and 15b. The coil substrate 15a comprises a plurality of laminated coil substrates 15a1, 15a2 and 15a3, and the coil substrate 15b comprises a plurality of coil substrates 15b1 to 15b3. The bottom substrates 15a3 and 15b3 are integrated with each other by a flexible common member 15c. On each sides of each coil substrate, focusing coil 15X for moving the pickup holder 16 in the focusing direction and a pair of tracking coils 15Y for moving the pickup holder 16 in the tracking direction are mounted.

Figure 5:
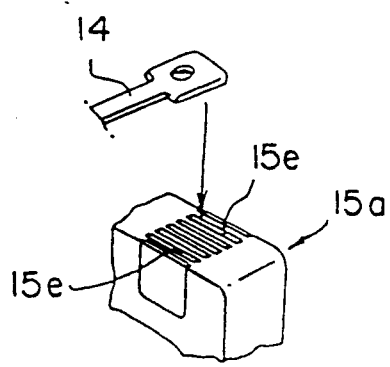
FIGS. 5 and 6 show a connecting portion of a conductive wire with the coil substrate.
Figure 6:
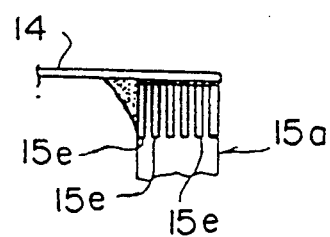
Figure 7:
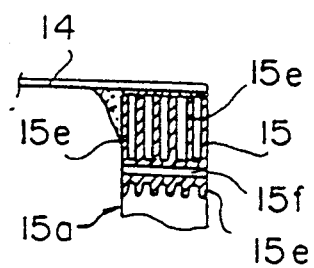
FIG. 7 shows another example of the connecting portion of FIG. 6.

FIGS. 5 and 6 show a connecting portion of the conductive wire 14 with the coil substrate 15a. The substrate 15a has a plurality of metallic lands 15e embedded therein. An end portion of the wire 14 is soldered to the lands 15e. As shown in FIG. 7, the lands 15e may be connected with each other by forming a through hole 15f. Since the wire 14 is soldered to a plurality of lands 15e, the connection between the wire and lands are ensured.

Figure 8:
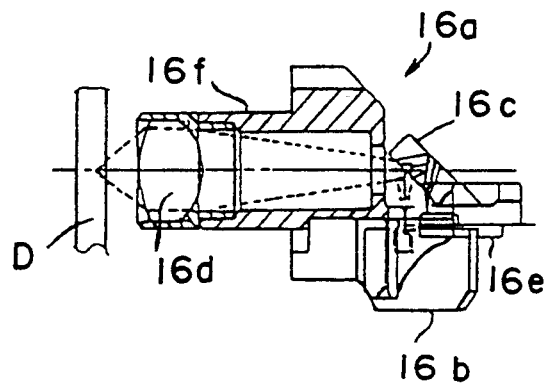
FIG. 8 is a sectional view of an optical system.

Referring to FIG. 8 showing the optical system 16, the system comprises a light emitting element 16b for emitting a laser beam, a mirror 16c for reflecting the laser beam to a disk D, an objective 16d for focusing the laser beam on the disk D, and a light receiving element 16e for receiving the reflected beam from the disk D. These components are provided in a plastic body 16f.

The laser beam from the light emitting element 16b is reflected on the mirror 16c to the disk D and focused on the disk D by the objective 16d. The reflected beam from the disk D passes through the objective 16d and is reflected to the light receiving element 16e by the mirror 16c. The circuit including the light emitting element 16b and light receiving element 16e is connected to the terminals 13e through the flexible wiring plate 17.

Figure 9:
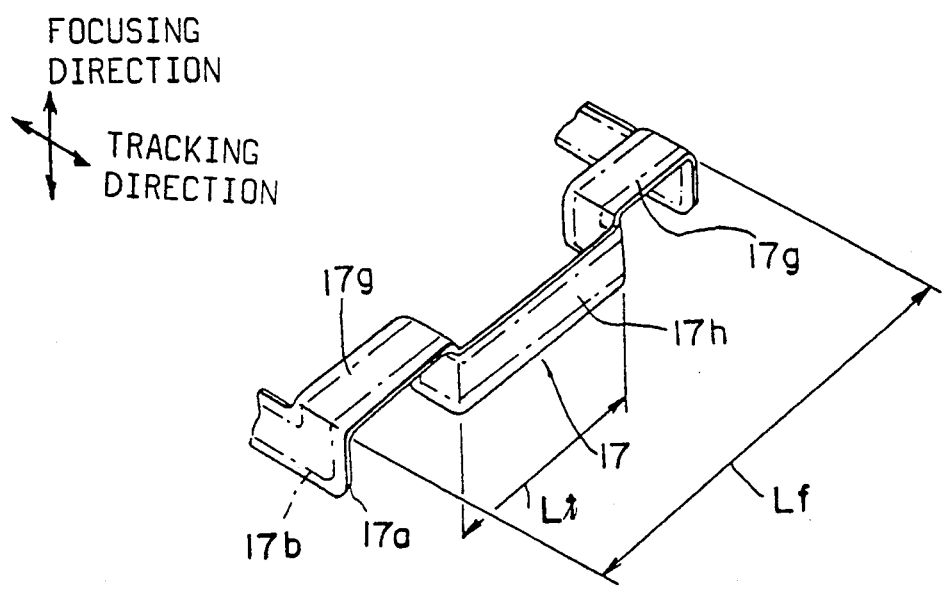
FIG. 9 is a perspective view showing a flexible wiring plate.

FIG. 9 shows the flexible wiring plate 17. The plate 17 comprises a base 17a, copper foil 17b on the base 17c, and a cover layer for covering the copper foil 17b.

A pair of horizontal planes 17g are disposed perpendicularly to the focusing direction at both end portions of focusing effective length Lf of the flexible wiring plate 17. A vertical plane 17h perpendicular to the tracking direction is disposed between the horizontal planes 17g.

Accordingly, the effective length Lf of the flexible plate 17 for focusing becomes approximately equal to the suspension effective length of the suspension wire 14. Therefore, the optical axis of the optical system 16a does not tilt when focusing.

The tracking effective length Lt for the tracking is ⅓ to 1/5 of the focusing effective length Lf. Although the length Lt is shorter than the length Lf, it has no influence on the tracking of the optical system.

Figure 10:
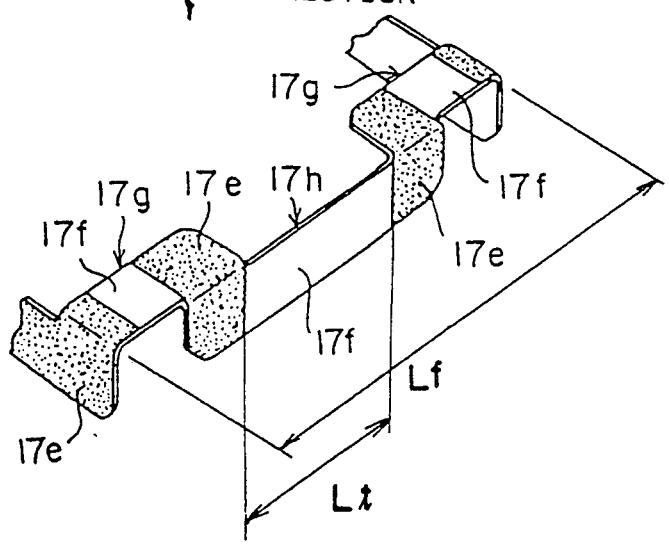
FIG. 10 is a perspective view showing another example of the flexible wiring plate.
Figure 11:
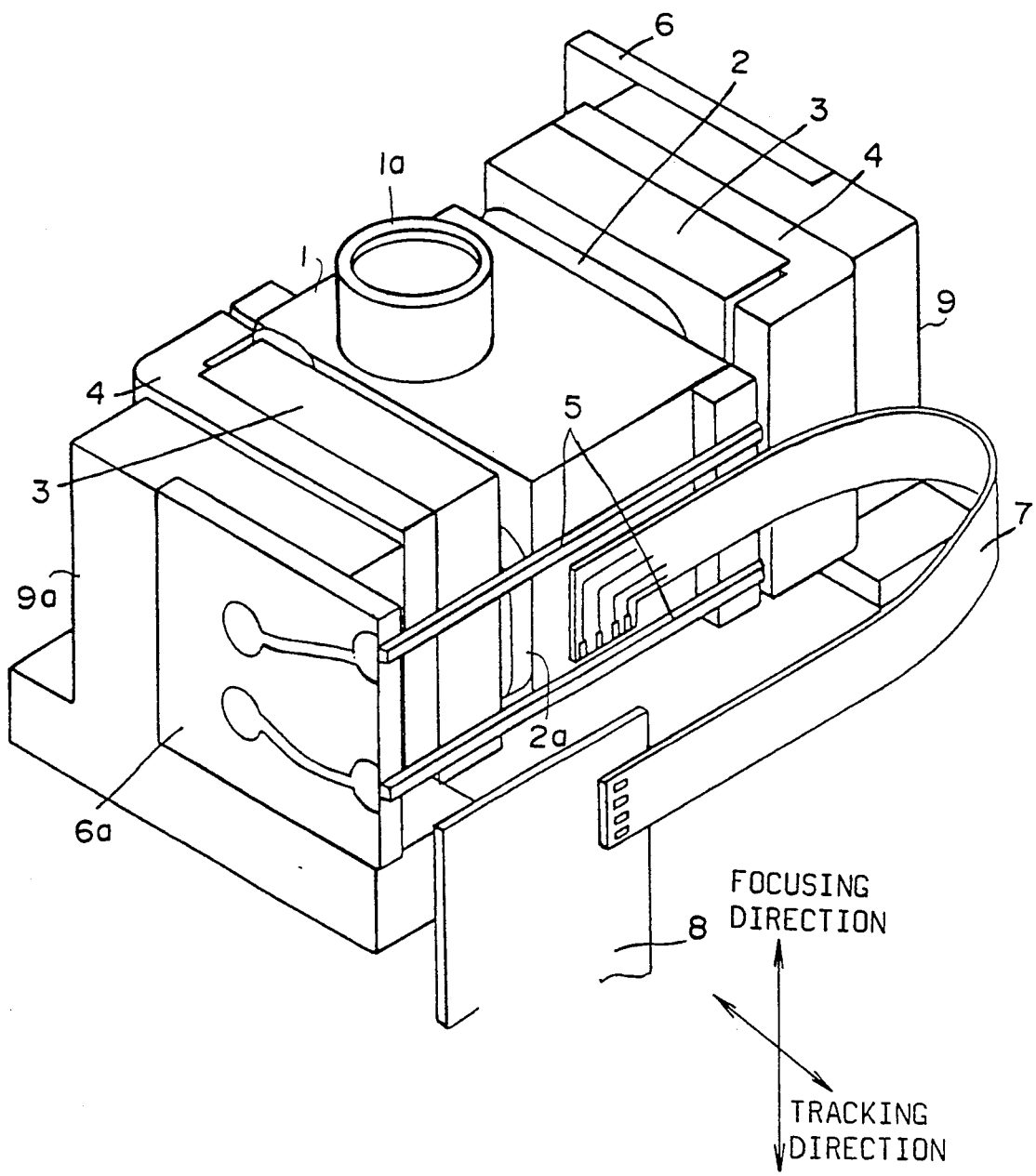
FIG. 11 is a perspective view showing a conventional optical pickup.

FIG. 10 shows a flexible wiring plate 17c as another example. The flexible plate 17c comprises a base and a copper foil like the plate 17 of FIG. 9. Each bent portion between the horizontal plane 17g and the vertical plane 17h is coated with a cover layer 17e of polyimide resin. Other plane portion than the cover layer 17e are coated with a cover layer 17f of resist consisting of meramin resin or epoxy resin. Since the polyimide resin has a higher toughness than the resin of the resist, the bent portion is not broken. On the other hand, the soft cover layer 17f has no influence on the focusing and tracking.

In operation, the optical pickup is moved in the radial direction of the disk D to a predetermined position by a driving device (not shown), where data on the disk is read by the pickup.

The laser beam from the light emitting element 16b is reflected on the mirror 16c to the disk D and focused on the disk D by the objective 16d. The reflected beam from the disk D passes through the objective 16d and is reflected to the light receiving element 16e by the mirror 16c.

In accordance with the light receiving element 16e, exciting currents are supplied to the focusing coil 15X and tracking coil 15Y (FIG. 3), so that the holder 16 is moved so as to perform the focusing and tracking of the pickup. Since the focusing effective length Lf of the flexible plate 17 for focusing is approximately equal to the length of the suspension effective length of the suspension wire 14, the optical axis of the optical system 16a does not tilt at focusing. Since the tracking effective length Lt is ⅓ to 1/5 of the focusing effective length Lf, the flexible plate 17 has no influence on the tracking of the optical system.

The flexible wiring plate 17 has horizontal planes 17g perpendicular to the focusing direction, which is disposed at both end portions of the focusing effective portion. Therefore, the flexible wiring plate is not twisted, so that the optical system does not tilt. Thus, an optical pickup having a high responsibility can be provided.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An optical pickup having a suspension base, a holder suspended from the suspension base by four wires in a form of a cantilever, coils provided on the holder to move the holder in a focusing direction and in a tracking direction, an optical system provided in the holder and having a mirror and an objective mounted in a body, a flexible wiring plate connected between the holder and the suspension base, and a circuit substrate, wherein a focusing effective length of the flexible wiring plate is approximately equal to an effective length of one of said suspension wires;

a pair of horizontal planes perpendicular to the focusing direction are provided on both end portions of the focusing effective length of said flexible wiring plate;

a vertical plane perpendicular to a tracking direction is provided between the horizontal planes of said flexible wiring plate, said vertical plane connecting said horizontal planes along said focusing effective length;

circuit means including a light emitting element for emitting a laser beam, a light receiving element for receiving a reflected beam from a disk, said circuit means being mounted on the holder;

first wiring means is provided for supplying exciting currents to the coils on the holder from the circuit substrate through the four wires; and second wiring means is provided for applying a voltage from the circuit substrate through the flexible wiring plate to the light emitting element, and for receiving a voltage from the light receiving element through the flexible wiring plate.

2. The optical pickup according to claim 1, wherein said flexible wiring plate includes bent portions between adjacent portions thereof, said bent portions being coated with a first resin and other portions than the bent portions are coated with a second resin, the first resin having a toughness higher than the second resin.

3. The optical pickup according to claim 1, wherein an effective length of the vertical plane is ⅓ to 1/5 of the focusing effective length.

4. An optical pickup having a suspension base, a holder suspended from the suspension base by four wires in a form of a cantilever, coils provided on the holder to move the holder in a focus direction and in a tracking direction, an optical system provided in the holder and having a mirror and an objective mounted in a body, a flexible wiring plate connected between the holder and the suspension base, and a circuit substrate, comprising:

said flexible wiring plate having a pair of end portions secured to the suspension base and the holder, a face of each of the end portions being in a plane parallel to the focus direction and perpendicular to an extending direction of the four wires, and extending in a direction perpendicular to the extending direction, a pair of middle portions adjacent the end portions, a face of each of the middle portions being in a plane perpendicular to the focus direction, and a central portion between the middle portions, a face of the central portion being in a plane perpendicular to the faces of the end portions and the middle portions;

circuit means including a light emitting element for emitting a laser beam, a light receiving element for receiving a reflected beam from a disk, said circuit means being mounted on the holder;

first wiring means is provided for supplying exciting currents to the coils on the holder from the circuit substrate through the four wires; and second wiring means is provided for applying and receiving voltages to the light emitting element and from the light receiving element from and to the circuit substrate through the flexible wiring plate.

* * * * *

UNITED STATES PATENT AND TRADEMARK OFFICE
CERTIFICATE OF CORRECTION

PATENT NO. : 5,287,337
DATED : February 15, 1994
INVENTOR(S) : Taichi Akiba, et al It is certified that error appears in the above-indentified patent and that said Letters Patent is hereby corrected as shown below:

On the title page, Item [73], first line, change "Corporatioin" to -- Corporation --.

Signed and Sealed this

Twenty-seventh Day of September, 1994

Attest:

BRUCE LEHMAN

*Attesting Officer*  *Commissioner of Patents and Trademarks*